United States Patent [19]

Moroto et al.

[11] Patent Number: 5,249,478
[45] Date of Patent: Oct. 5, 1993

[54] SHIFT SYSTEM HAVING A MANUAL SPEED SELECTING MECHANISM FOR A VEHICULAR AUTOMATIC TRANSMISSION

[75] Inventors: Shuzo Moroto, Nagoya; Masashi Hattori; Shigekazu Ohara, both of Anjo, all of Japan

[73] Assignee: Aisin Aw Co., Ltd., Japan

[21] Appl. No.: 906,851

[22] Filed: Jun. 30, 1992

[51] Int. Cl.[5] .............................................. F16H 57/06
[52] U.S. Cl. ............................................ 74/475; 74/477
[58] Field of Search ....................................... 74/475, 477

[56] References Cited

U.S. PATENT DOCUMENTS 4,326,432  4/1982  Miller ................................. 74/475
4,328,712  5/1982  Osborn ............................. 74/475 X Primary Examiner—Allan D. Herrmann
Assistant Examiner—William O. Trousdell
Attorney, Agent, or Firm—Lorusso & Loud

[57] ABSTRACT

A shifter with a manual speed selecting mechanism for a vehicular automatic transmission. The shifter includes a stationary member mounted on a vehicle body; a rocking retainer supported in a manner to rock on a first axis extending through and fixed by the stationary member, for transmitting motion of a shift lever to the automatic transmission. The shift lever is supported for rotation on the first axis and on a second axis, which is perpendicular to the first axis, and is brought into and out of engagement with the rocking retainer when rotated on the second axis. A switch is provided for detecting the position of the shift lever. A lock plate is supported on the rocking retainer for bringing the rocking retainer into and out of engagement with the stationary member when actuated by the rotation of the shift lever on the second axis.

8 Claims, 16 Drawing Sheets

SHIFT SYSTEM HAVING A MANUAL SPEED SELECTING MECHANISM FOR A VEHICULAR AUTOMATIC TRANSMISSION

BACKGROUND OF THE INVENTION

1. Field of the Invention

The present invention relates to a shift system for use with a vehicular automatic transmission and, more particularly, to a shift system capable of switching between shift range change in an automatic mode and manual speed selection.

2. Description of the Prior Art

A shifter in a conventional automatic transmission has an I-shaped shift pattern, in which not only the individual ranges of parking (abbreviated hereinafter as "P"), reverse ("R"), neutral ("N") and drive ("D") ranges but also a second range (abbreviated hereinafter as "S") and a low range ("L") as modes for engine braking in uphill running are arranged in series.

The conventional automatic transmission is constructed to effect speed changes by a combination of two modes: the range change for determining each of the P, R, N, D, S and L ranges by mechanically switching the manual valve in a hydraulic servo control circuit for actuating the frictional engagement elements thereof; and the speed change for selecting a predetermined gear stage in the determined range by controlling the solenoid valves in the hydraulic servo control circuit electronically in accordance with the running speed and throttle opening of the vehicle. In the D, S and L ranges in the running mode, moreover, the speed changes in each range are automatically effected.

In order to enhance the fun of driving and the "feeling" of shifting a shift system has recently been introduced in the form of an automatic transmission to which is added a manual speed selecting mechanism enabling manual selection of a specific gear stage, reflecting the intention to give a driver positive control of shifting in forward running.

This shift system is exemplified by the technology which is disclosed in Japanese Patent Laid-Open No. 8545/1990. In this system, the automatic shift is carried out as in the prior art by moving the shift lever in a first shift pattern in an ordinary I pattern, and the manual speed charge is carried out by switching the shift lever sideways to a second shift pattern parallel to the first shift pattern and then moving it within the second shift pattern. In this system, moreover, the movement of the shift lever in the first shift pattern is mechanically transmitted to the transmission, and the movement of the shift lever in the second shift passage is detected by a sensor or switch which signals position of the shift lever and provides for electronic control of the transmission.

In the shift system described above, however, no means is provided for restricting and holding a linkage member, which is used for transmitting the motion of the shift lever in the first shift pattern to the transmission, in an uncoupled position, when the coupling between the shift lever and the linkage member is released by the transverse movement of the shift lever. As a result, the re-coupling of the shift lever when returned to the first shift pattern may lack smoothness due to misalignment.

SUMMARY OF THE INVENTION

With the foregoing background in mind, the present invention has as its object provision of a shift system with a manual speed selecting mechanism for a vehicular automatic transmission, which system can effect a smooth return from the manual speed selecting operation to the automatic shifting operation of the shift lever and can prevent the manual valve of the automatic transmission from being accidentally moved by shock or the like.

In order to achieve the above-specified objective, therefore, there is provided according to the present invention a shifter with a manual speed selecting mechanism for a vehicular automatic transmission. The shifter includes a stationary member mounted on a vehicle body; a rocking retainer supported in a manner to pivot on a first axis formed through and fixed by the stationary member, for transmitting motion of a shift lever to the automatic transmission. A shift lever is mounted for rotation about the first axis and a second axis, which is perpendicular to the first axis, and is brought into and out of engagement with the rocking retainer by rotation on the second axis. A switch detects the position of the shift lever. A lock plate is provided on the rocking retainer for bringing the rocking retainer into and out of engagement with the stationary member, responsive to rotation of the shift lever about the second axis.

In the shifter of the present invention, the lock plate supported on the rocking retainer is actuated by the rotation of the shift lever about the second axis to bring the rocking retainer into and out of engagement with the stationary member. As a result, the rocking retainer can be prevented from erroneous movement during the manual speed selection by means of the shift lever, thereby providing for smooth reengagement between the shift lever and the rocking retainer when the shift lever is returned to the automatic mode position. Moreover, since the rocking retainer is connected to the manual valve and is locked in a fixed position during the manual speed selection, the manual valve is prevented from unintended switching by shock or the like received by the vehicle body.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENT

An embodiment of the present invention will be described in the following with reference to the accompanying drawings.

Figure 1:
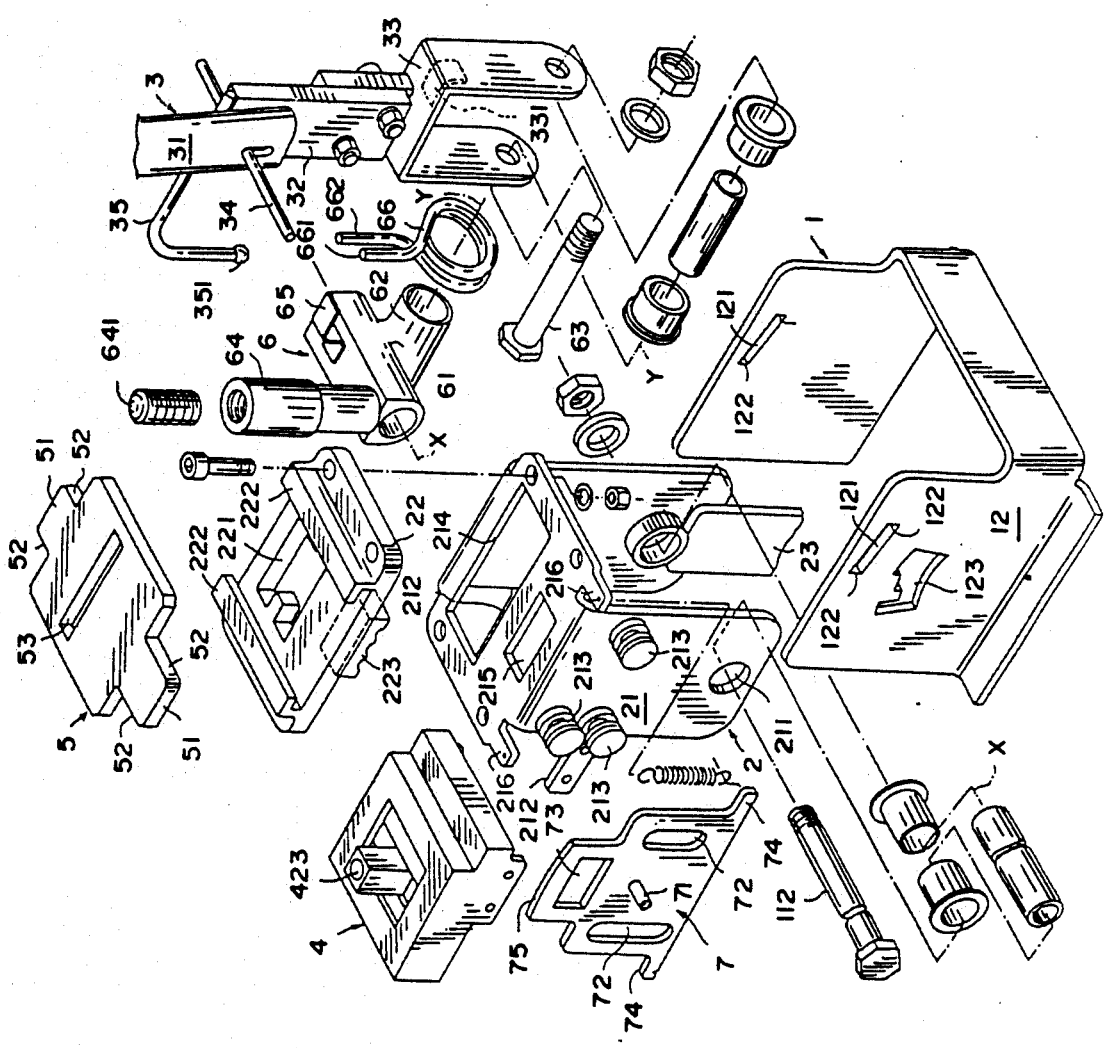
FIG. 1 is an exploded perspective view showing the whole structure of one embodiment of the present invention.

FIGS. 1 and 2 show the overall structure of the embodiment of the present invention. In the description to follow, the expressions "longitudinal," "transverse," "vertical" and so on are based, for convenience of description, on the basis of the arrangement of the embodiment as mounted on a vehicle or automobile but are intended to limit the invention.

As shown in FIG. 1, shifter of the illustrated embodiment includes a stationary member 1 for mounting on a vehicle body (not shown); a rocking retainer 2 supported in a manner to rock or pivot on a first axis (also to be referred to as the "transverse axis") X that is formed in the stationary member 1; a shift lever 3 mounted for rotation about the transverse axis X and transversely on a second axis (also to be referred to as the "longitudinal axis") Y that is perpendicular to the longitudinal axis X, so that it comes into and out of engagement with the rocking retainer 2 when rotated transversely on the longitudinal axis Y; and a switch box 4 acting as a switch means for detecting the position of the shift lever 3.

The rocking retainer 2 supports a lock plate 5 which is actuated by the transverse rotation of the shift lever 3 on the longitudinal axis Y to bring the rocking retainer 2 into and out of engagement with the stationary member 1.

The individual parts will now be described in more detail.

The stationary member 1 is composed of a dish-shaped support portion 11 to be (as shown in FIG. 2) fastened to the vehicle body (not shown) by means of bolts, and a generally C-shaped a body portion 12 welded to the upper face of the support portion 11 and having an open front. Moreover, the support portion 11 is provided at its central portion with a pair of downward projecting brackets 111, which are formed with bolt holes 113 for receiving therein a bolt 112 forming the transverse axis X. The body portion 12 has its paired transverse side walls punched to form slots 121 at their upper portions. These slots 121 provide front and back ends 122 forming rock locking faces for the lock plate 5. One transverse side wall of the body portion 12 is further formed at its central portion with an inhibit hole 123 which provides an inhibit cam surface on its upper edge.

The rocking retainer 2 is formed of a body 21 having its lower portion open to form the shape of letter "C." A gate plate 22 made of plastic has its four corners fastened to the upper wall of the body 21 by means of bolts. A manual valve connection member 23 is welded to the lower end of the right-hand wall of the gate plate 22. The body portion 21 of rocking retainer 2 has its two side walls formed at their lower portions with holes 211 for receiving the aforementioned bolt 112 and at their front edges with brackets 212 which project for mounting and supporting the switch box 4. The left-hand wall of the body 21 is equipped with three guide posts 213 which engage with slide slots 72 of an inhibit plate 7 (as will be detailed hereinafter) to guide the vertical movements of the inhibit plate 7. The body 21 has its upper wall punched to form a hole 214 for receiving the shift lever 3 and a hole 215 for receiving a detent cam 223 (as will detailed hereinafter). Moreover, a pair of spring support projections 216 project leftward from the upper wall of the body 21. The gate plate 22 is formed with a hole 221 for receiving the shift lever 3; a pair of grooved flanges 222 for slidably guiding the lock plate 5 in a direction intersecting the hole 221 at a right angle with detent block 223 projecting from the lower face to form a downward facing cam surface. The hole 221 is formed in the shape of the letter "H" with I-shaped slots connected to each other at their centers. The connecting central portion of the hole 221 has a length substantially equal to the width (longitudinal length) of the connection portion 32 of the shift lever 3 fitted therein (See FIG. 7(a)). As a result, the shift lever 3 has its motion transmitted through the gate plate 22 to the body of rocking retainer 21 when it is rotated longitudinally on the transverse axis X while positioned in the connecting central portion of the hole 221 of the gate plate 22.

The lock plate 5 is formed of plastic in the shape of a cross and is provided at its center with an elongated slot 53 for receiving the connection portion 32 of the shift lever 3. This slot 53 has its width substantially equal to the transverse width of the connection portion 32 of the shift lever 3 and its length substantially equal to the gap between the grooved flanges 222 of the gate plate 22. As a result, the lock plate 5 is guided by the grooved flanges 222, when the shift lever 3 rotates transversely on the longitudinal axis Y, so that it moves therewith to slide in a direction perpendicular to the hole 221 (covering and uncovering hole 221) of the gate plate 22. On the other hand, when the shift lever 3 rotates longitudinally on the transverse axis X, the lock plate 5 will not move together with the shift lever 3.

The shift lever 3 has a stem 31 with a shift knob attached thereto, a connection portion 32 welded to the lower end of the stem 31 and a generally C-shaped arm portion 33 fastened to the lower end of the connection portion 32 by means of bolts. Through a vertical slot in the lower portion of the stem 31 extends an inhibit pin 34 which is allowed to move vertically, as in the shift lever of the prior art. To the upper edge of the connection portion 32 is welded a shift ar 35 for engaging the switch box 4. This shift arm 35 is formed with a ball portion 351 at its distal end. The arm portion 33 is supported on a cross sleeve 6 through a bolt 63 fitted within a sleeve portion 62, so that arm portion 33 can rotate (transversely) about the longitudinal axis Y.

The cross sleeve 6 has sleeve portions 61 and 62 which intersect each other at a right angle for receiving, respectively, the bolt 112 forming the transverse axis X and the bolt 63 forming the longitudinal axis Y. The cross sleeve 6 is provided with a detent plunger mechanism 64 which rises from the left-hand upper face of the sleeve portion 61. The detent plunger mechanism 64 constitutes detent means which is associated with the aforementioned detent block 223 for the shift lever 3 against the rocking retainer 2. This detent plunger mechanism has a plunger 641 which is pushed upward by a spring for engagement of its upper end with the downward facing cam surface of the detent block 223 to latch the shift lever 3 in the selected speed position and to moderate the time of shifting between the individual speed positions. In parallel with the sleeve portion 62 is disposed a torsion spring abutment member 65 which extends backward from the right-hand upper face of the sleeve 6. This abutment member 65 is clamped between the two 10 actuation ends 661 and 662 of a torsion spring 66 which has its coil portion wound around the rear portion of the sleeve 62, to thereby support the actuation ends 661 and 662. The aforementioned arm portion 33 is equipped with a similar torsion spring abutment member 331 which projects forward. As a result, the abutment member 331 pushes one of the two actuation ends 661 and 662 of the torsion spring 66, when the shift lever 3 is rotated transversely with respect to the cross sleeve 6. Since the outer of the actuation ends is supported on the abutment member 65, a righting force is exerted upon the shift lever 3 by the torsion spring 66.

At the generally central portion of the inhibit plate 7, is a plate pin 71 which is received in the aforementioned inhibit hole 123 of the stationary member body portion 12 for cooperation with the inhibit cam surface (upper edge of 123) to provide an inhibit mechanism. The inhibit plate 7 is punched on both sides of the plate pin 71 to form the slots 72 for receiving the guide posts 213 attached to the body 21 of the rocking retainer 2. The inhibit plate 7 is further punched at its upper portion to form a hole 73 for receiving the transverse ear portion of the aforementioned cross-shaped lock plate 5. The inhibit plate 7 is formed with spring support projections 74 at the two sides of its lower end. The inhibit plate 7 has its upper edge 75 formed into an arcuate shape about the transverse axis X. The arcuate upper edge 75 plays a role to transmit the displacement of the shift lever 3 to the inhibit plate 7 while avoiding interference with the rocking motion of the shift lever 3 with the inhibit pin 34.

Figure 3:
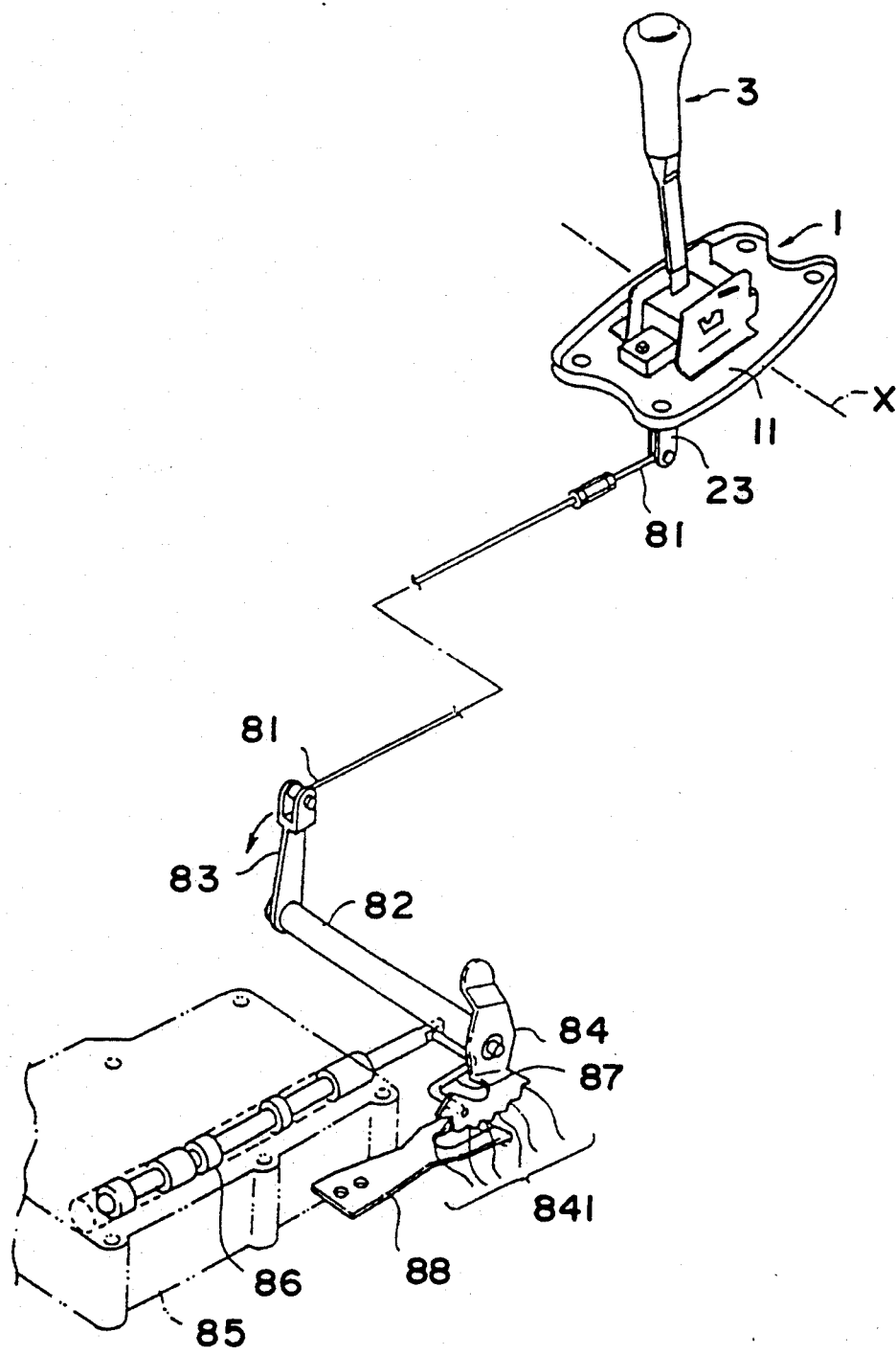
FIG. 3 is a perspective view showing the connection of the shifter of FIG. 1 to the automatic transmission.

FIG. 3 is a perspective view showing connection between the above-described shifter, a manual valve 86 and the automatic transmission. The manual valve connection member 23 is connected through a control rod 81 to an outer lever 83 which is attached to one end of a manual shaft 82. The other end of this manual shaft 82 carries mounted thereon a detent lever 84, which is connected through a rod 87 to a manual valve 86 sliding in a valve body 85. The detent lever 84 has a lower peripheral surface formed with cam notches 841. A detent spring 88 is arranged with its actuation end abutting against the cam notches 841.

Figure 4:
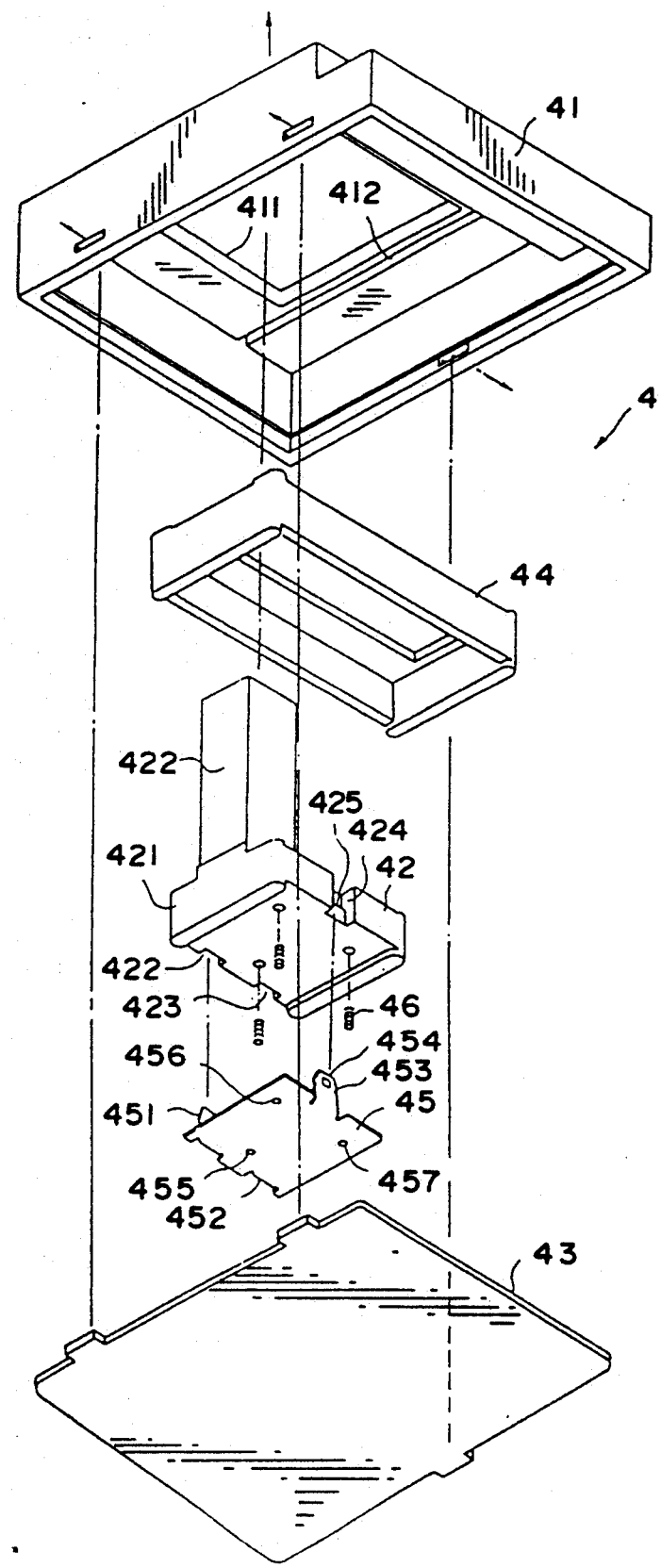
FIG. 4 is an exploded perspective view showing the switch box component of the embodiment of FIG. 1.

With reference to FIG. 1, the switch box 4 is fastened to the bracket 212 of the rocking retainer 2 by means of screws. FIG. 4 is an exploded perspective view showing the detail of the switch box 4. This switch box 4 is composed of a casing 41, a slider 42 slidably mounted in the casing 41, and a printed circuit board (as will be shortly referred to as the "PC board") 43. A contact plate 45 is attached to the slider 42, and a slider guide 44 is sandwiched between the casing 41 and the slider 42. The slider guide 44 is allowed to slide longitudinally in the casing so that projections embedded in its upper face (not shown) are received in and guided by guide grooves 412 which are formed in the lower face of the casing 41. Thus, the slider guide 44 constitutes both a retainer for preventing the slider 42 from coming upward out of casing opening 411 and guide means for guiding the slider 42 transversely. This slider 42 is formed with a joint portion 422 which extends upward from the upper face of a block portion 421 to project to the exterior of the switch box 4 through the casing opening 411. The ball portion 351 of the actuation arm 35 is slidably fitted in a cylindrical bore 423 (as shown in FIG. 1) formed in the joint portion 422. The block portion 421 of the slider 42 is formed with two front and one rear notches 422 to 424. The contact plate 45 is supported and retained on the slider 42 by its projections 451 to 453 which are received in notches 422 to 424 and by the distal ends (one of which is designated at numeral 454) of the projections 451 to 453 engaging the step portions (one of which is also detected at number 425) of the aforementioned notches 422 to 424. The contact plate 45 has its lower face formed with three projecting contacts 455 to 457 which are arranged at the apexes of a triangle. Behind (above) those contacts 455 to 457 are three compression springs 46 which are mounted in the holes formed in the block portion 421 of the slider 42. As a result, the three contacts 455 to 457 of the contact plate 45 are held in contact with the PC board 43 by the spring forces. Connecting terminals (not shown) are arranged on the step portions at the back of the casing 41.

Figure 5:
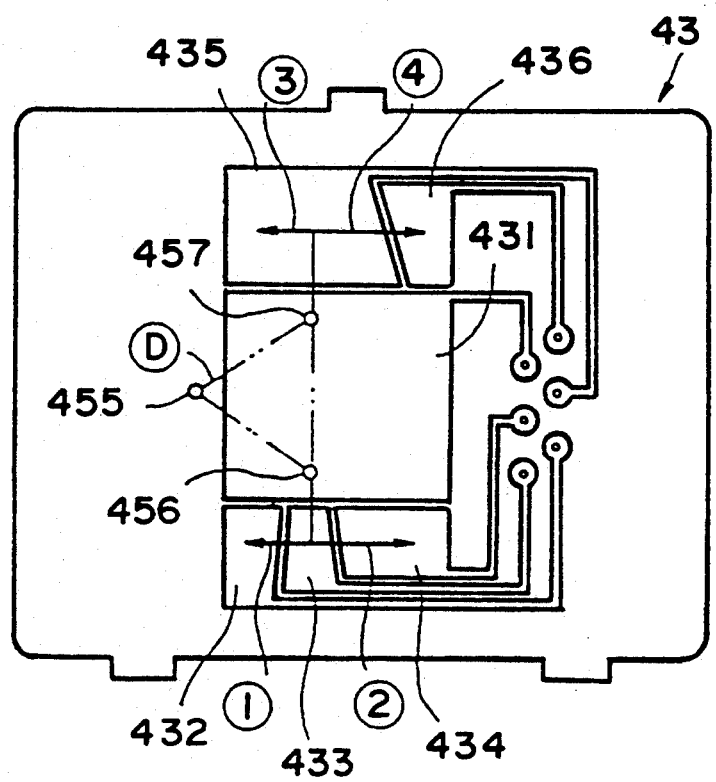
FIG. 5 is a top plan view showing a PC board in the switch box.

FIG. 5 is a top plan view showing the circuit pattern of the PC board and shows the positional relationship among the three contacts which contact the circuit pattern. As shown the PC board 43 has six mutually isolated conductors 431 to 436. The central conductor 431 is always in contact with one of contacts carried by the contact plate 45, while the remaining conductors are selectively brought into contact with the two contacts 456 and 457 as the contact plate 45 is moved. In this embodiment the conductor 432 is used to establish 1st speed; the conductor 434 is used to establish 2nd speed; the conductor 435 is used to establish 3rd speed; and the conductor 436 is used to establish 4th speed, but the conductor 433 is left unused. The individual contacts are in the positional relationship, as indicated at circled D, when the shift lever 3 is in the P, R, N and D positions.

Next, the operations of the shift system thus constructed will be sequentially described in the following.

FIGS. 6(a) to 6(d) are side elevations showing the motions of the individual members (overlapped) of the shift system and FIGS. 7(a) to 7(d) are top plan views showing the actions of the lock plate 5 of the shift system. FIG. 7 omits the inclinations of the individual members, which are caused by the inclination of the rocking retainer 2.

Figure 6A:
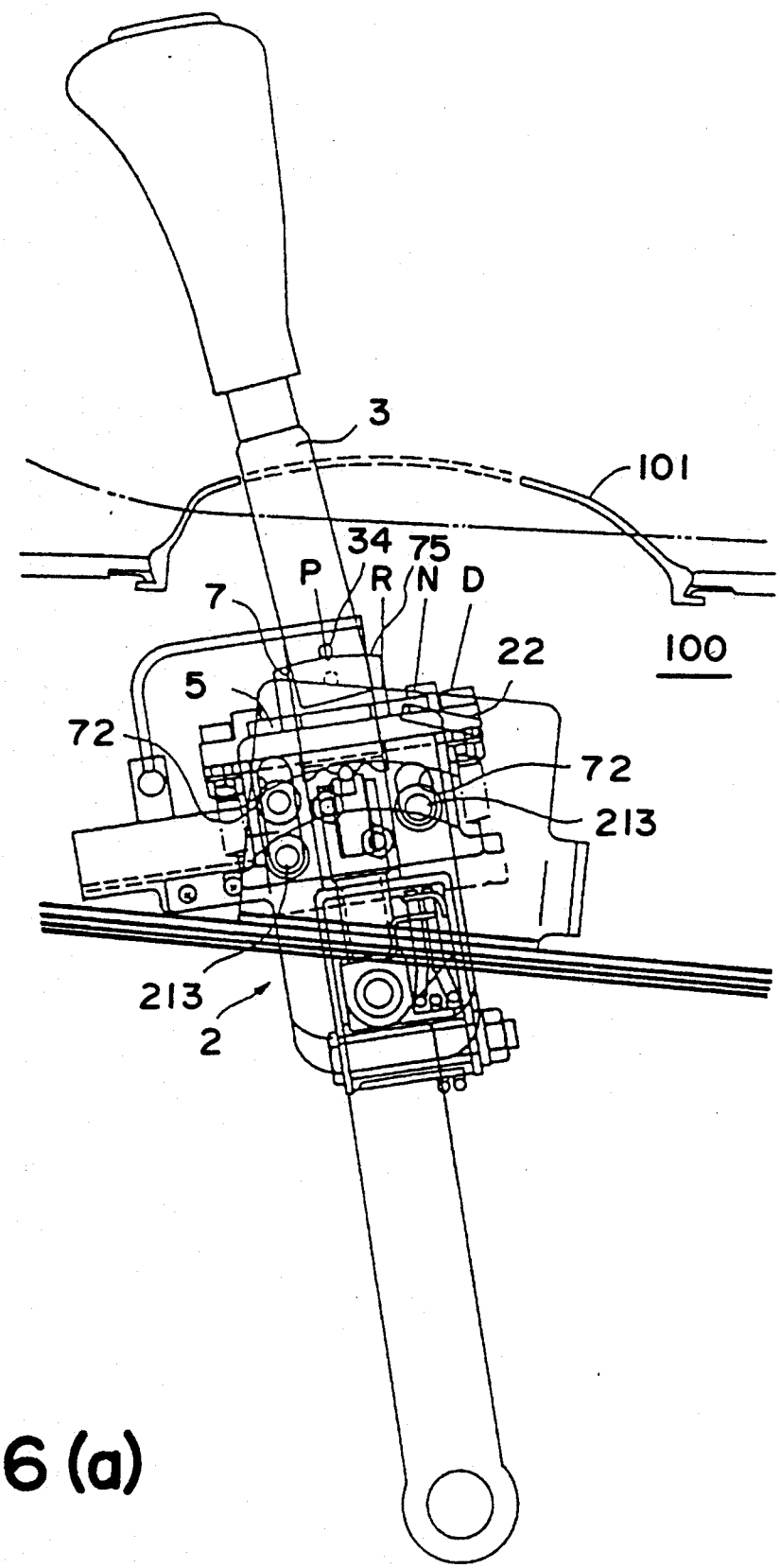
FIG. 6(a), 6(b), 6(c) and 6(d) are side elevation views showing the operations of the embodiment of FIG. 1 in a sequential order.
Figure 6:
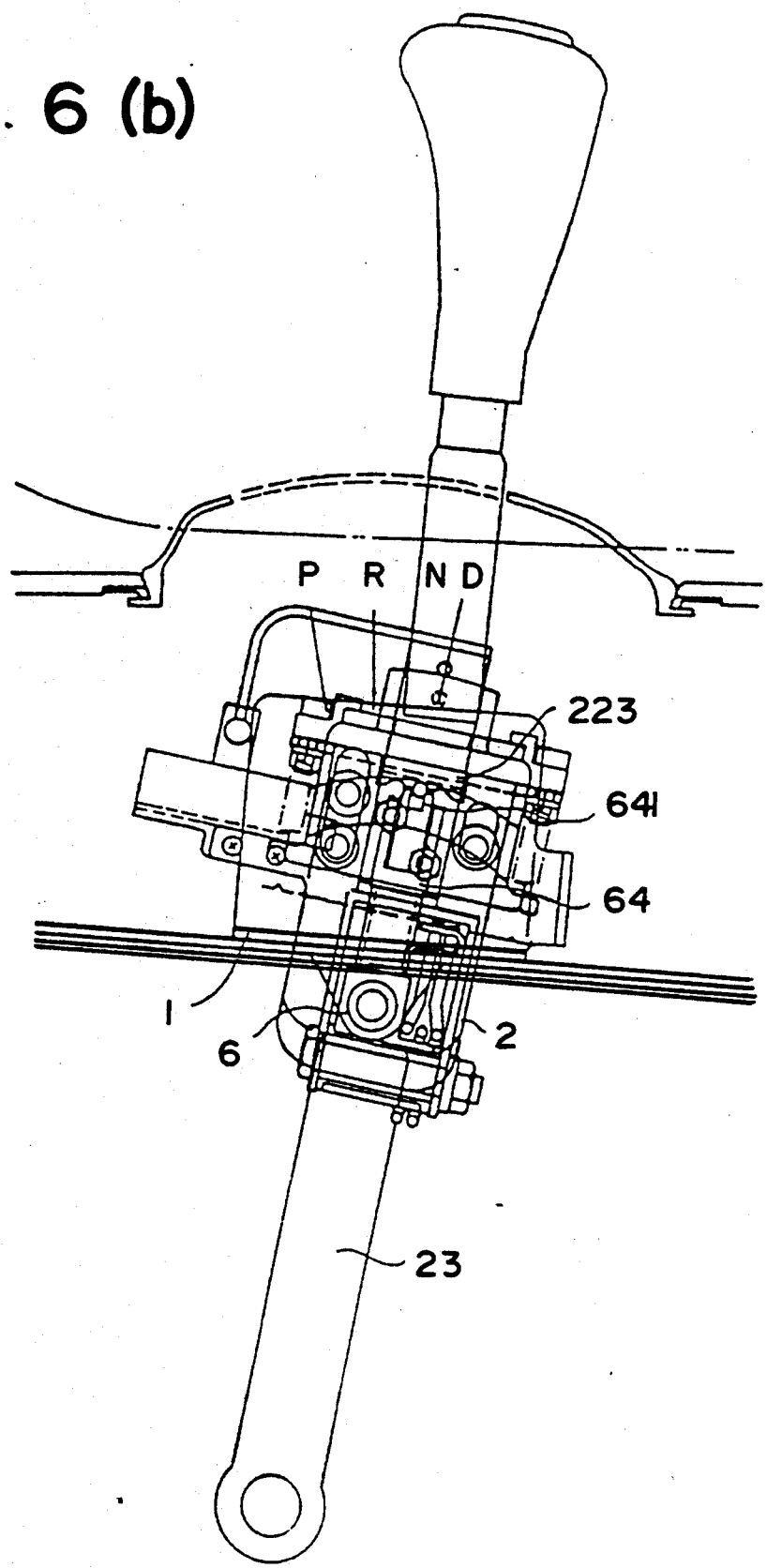
Figure 7A:
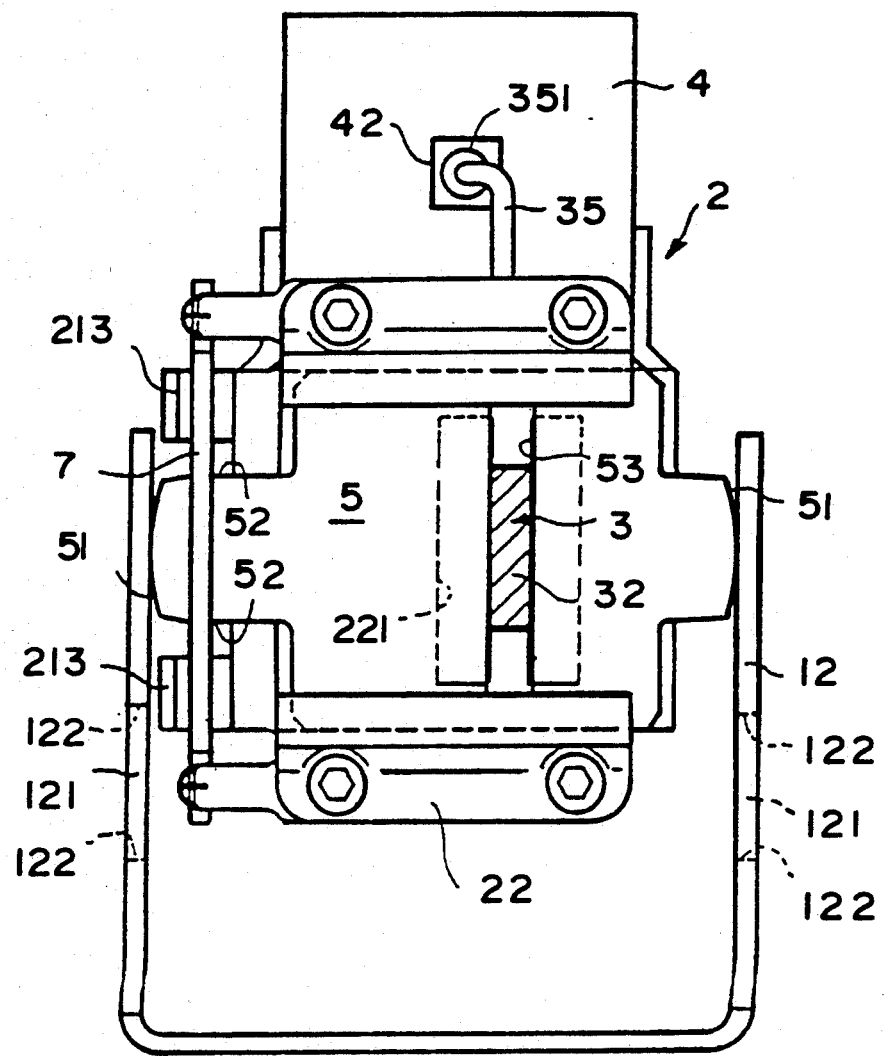
FIG. 7(a), 7(b), 7(c) and 7(d) are top plane views showing the operations of the lock plate component of the embodiment of FIG. 1.

FIG. 6(a) and FIG. 7(a) show the P position, in which the rocking retainer 2 is rocked (pivoted) to the foremost inclined state. In this state, the shift lever 3 is transversely positioned by the lock plate 5 so that it is in the central connecting portion of the H-shaped hole 221 of the gate plate 22. Then, the plate pin 71 of the inhibit plate 7 engages the foremost notch of the cam surface of the inhibit hole 123, as shown in FIG. 1, so that it is in the inhibit state.

When the shift lever 3 is pulled backward from that P position while pushing the knob button, the inhibit plate 7 is lowered by the action of the inhibit pin 34 pushing downward on its upper edge 75, while its downward movement is guided by the guide posts 213 until its plate pin 71 comes out of engagement with the foremost notch of the cam surface of the inhibit hole 123. Since the shift lever 3 and the gate plate 22 are engaged longitudinally in the central connecting portion of the H-shaped hole 221, the rocking retainer 2 is then rocked backward together with the shift lever 3 to the D position, as shown in FIG. 6(b), by way of the R and N positions. Meanwhile, the transverse rotation of the shift lever 3 is regulated, as shown in FIG. 7(a), by the sliding abutment between the rotation regulating face 51 of the lock plate 5 and the side wall inner face of the body portion 12 of stationary member 1. As a result of this motion, the manual valve connection member 23 is rocked longitudinally on the transverse axis X, as shown in FIG. 3, to push the control rod 81 connected to the lower end thereof so that the outer lever 83 is pivoted counter-clockwise, as indicated by arrow, to retract the rod 87 by the pivoting motions of the manual shaft 82 and the detent lever 84 in the same direction. Thus, the manual valve 86 is switched. This operation is moderated by the spring force of the detent spring 88 against the action of the detent lever 84.

When the shift lever 3 reaches the D position, the rotation regulating face 51 of the lock plate 5 assumes a position aligned with the slots 121 so that the lock plate 5 is released and allowed to rotate.

Figure 2A:
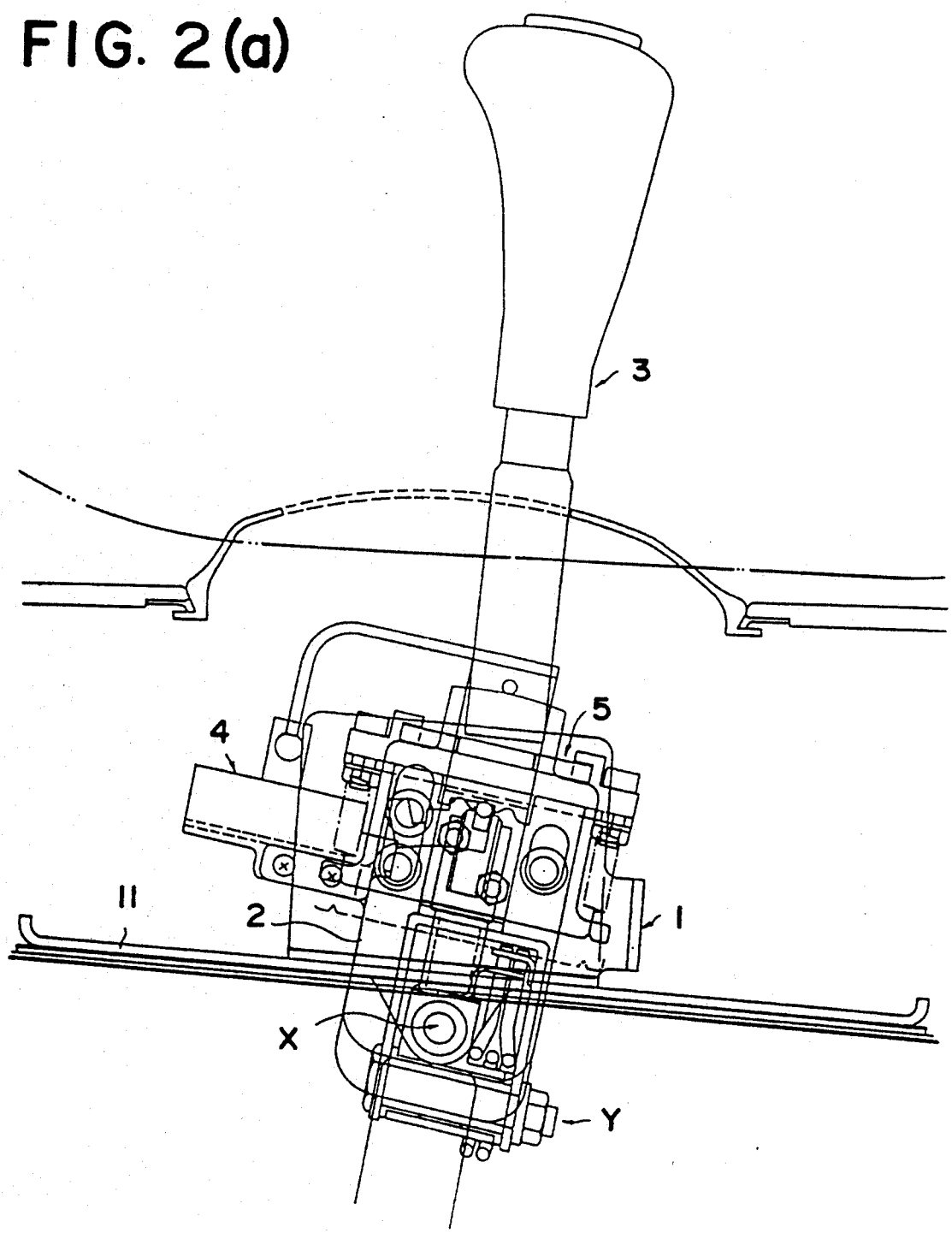
FIGS. 2(a), 2(b) and 2(c) show the embodiment of FIG. 1 assembled with the individual components being overlapped and present a side elevation at (a) a back elevation at (b), and a top plan view at (c)
Figure 2B:
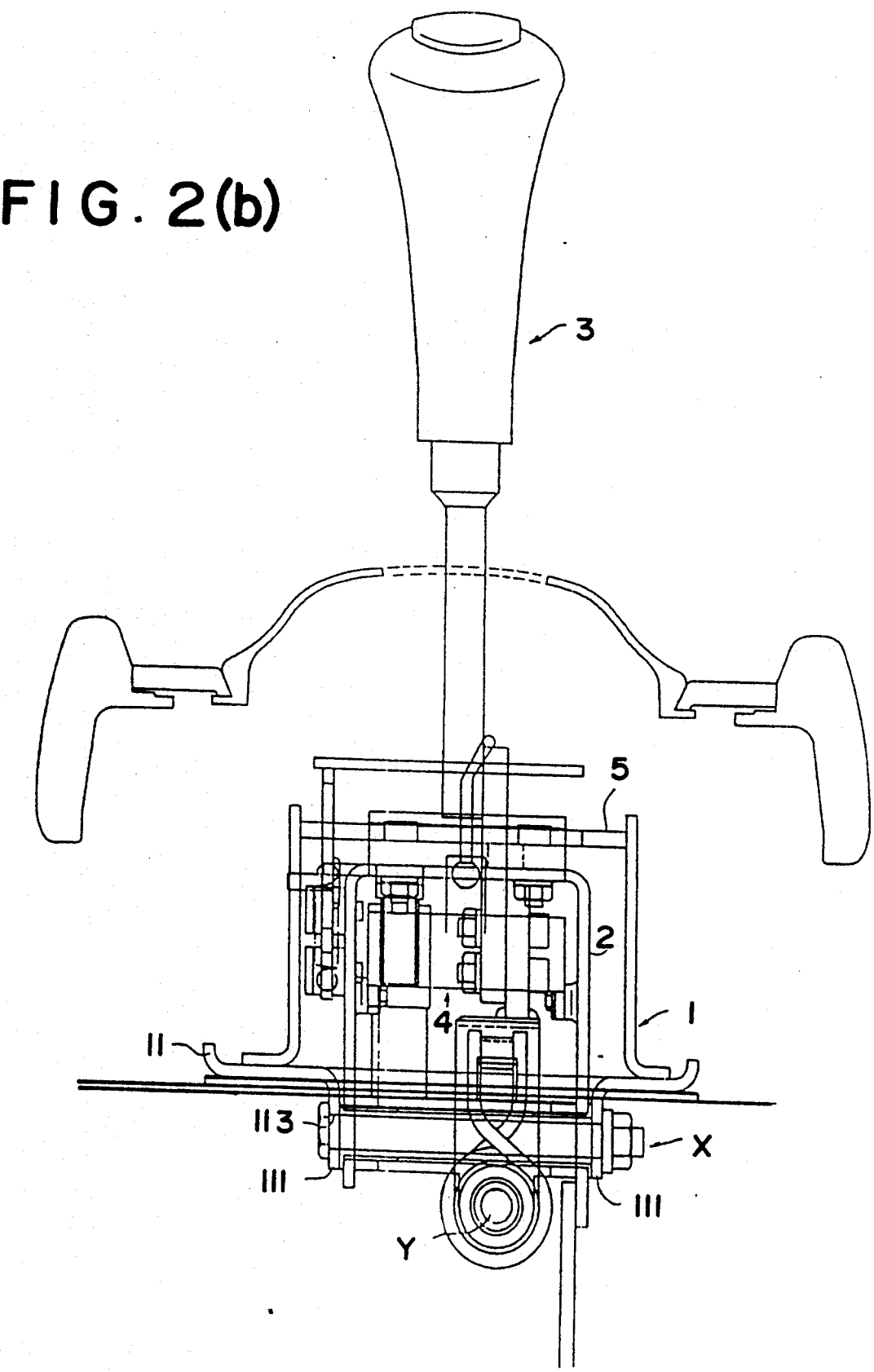
Figure 2C:
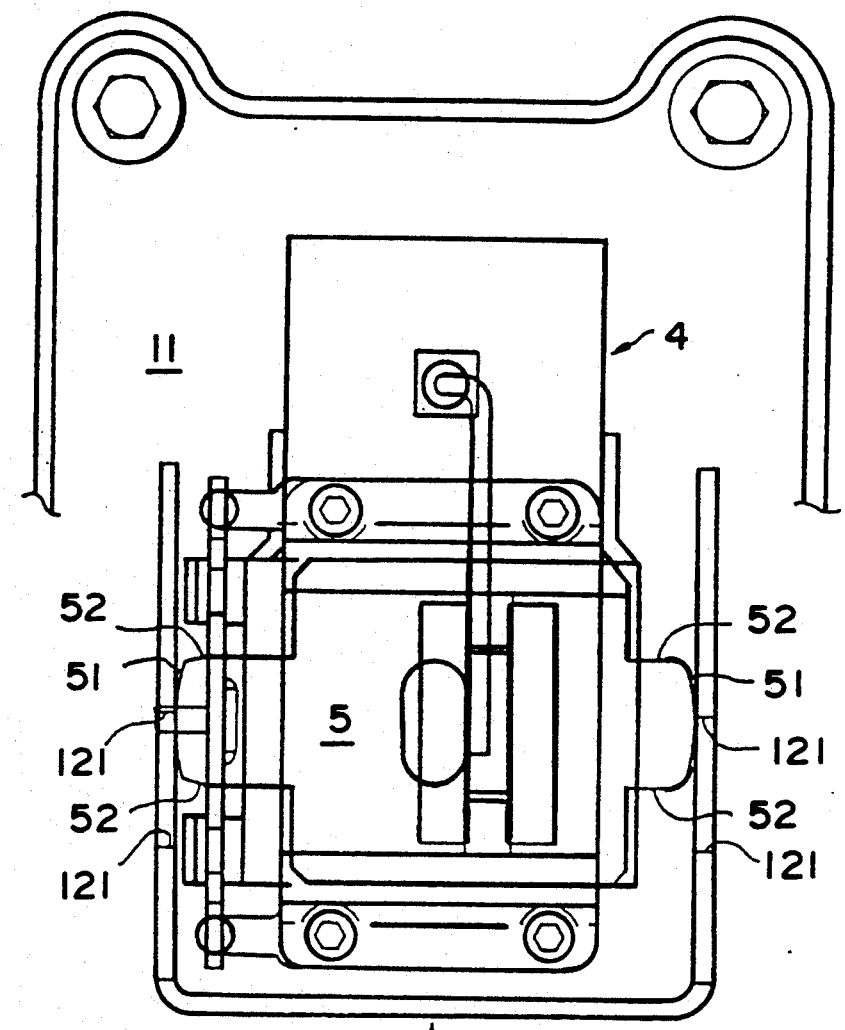
Figure 2C:
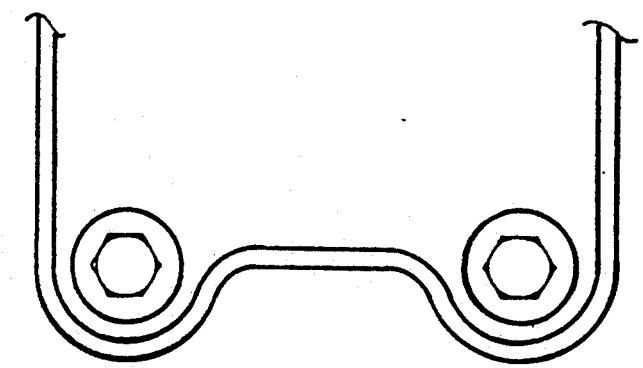
Figure 7B:
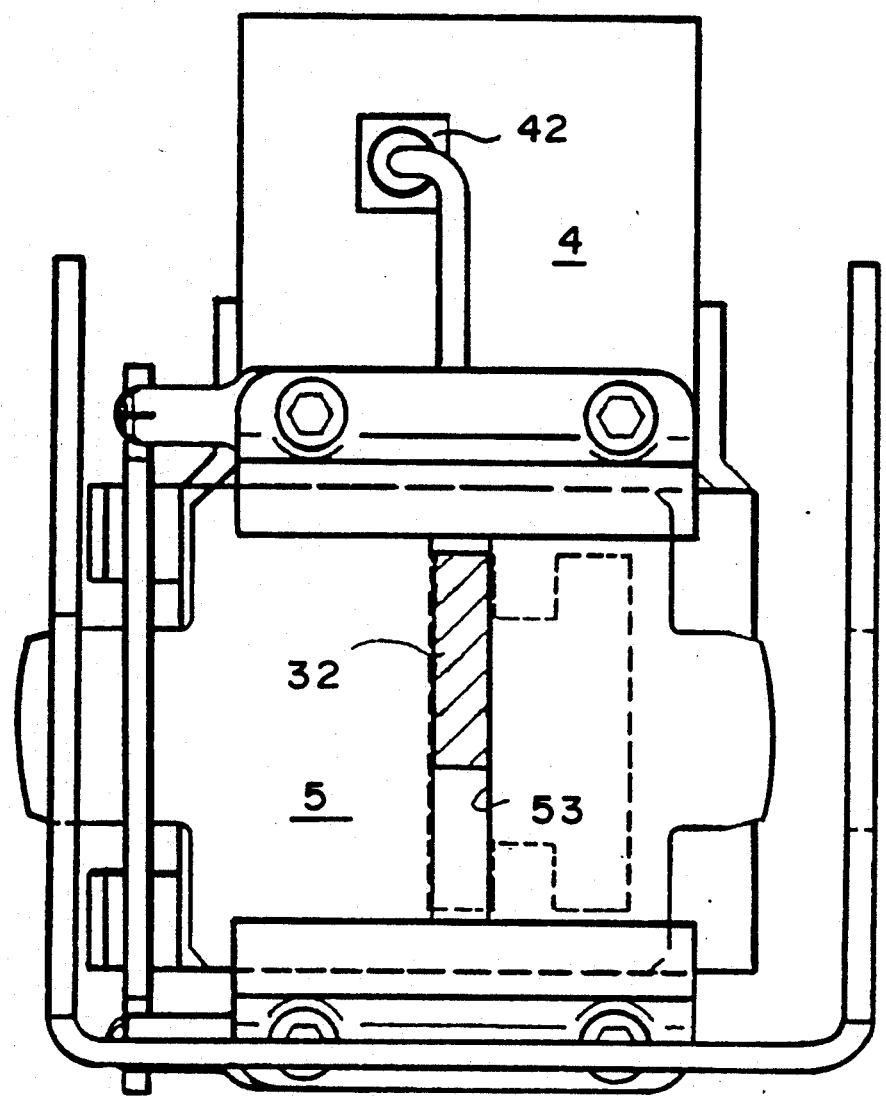

If the 1st speed is selected in this position, the shift lever 3 is moved to the left and forward. As a result of this leftward movement, the shift lever 3 pushes the lock plate 5 leftward so that its regulating face 52 slides leftward to come into engagement with the locking faces 122 of the holes 121 of the body portion 12 of stationary member 1. Thus, the rocking retainer 2 is regulated in its longitudinal rocking motion, and only the shift lever 3 is freed of any regulating forces. In these motions, the ball portion 351 of the actuation arm 35 fixed on the shift lever 3 slides the slider 42 of the switch box 4 to the left. Since, at this time, the righting force exerted by the torsion spring 66 (as shown in FIG. 1 and FIGS. 2(a) and 2(b)) is applied to the shift lever 3 so that a feel of resistance, similar to that experienced using a manual shift system of the prior art, is transmitted to the driver. In the subsequent forward motion, as shown in FIG. 7(b), the connecting portion 32 of the shift lever 3 slides forward along the slot 53 of the lock plate 5 to move the slider 42 of the switch box 4 forward. At this time, the plunger 641 of the cross sleeve 6 rides over the intermediate crests, from the central to the front notches of the cam surface of the detent cam 223. Then, the resistance to this action by the force of the plunger raising spring is transmitted to the driver. This feeling of resistance (moderation) is identical to the shift feeling which could be obtained from the detent spring 88 and the cam notch 841 (as shown in FIG. 3) at the time of a shift from the P position to the D position. It follows that the detent plunger mechanism 64 and the detent cam 223 perform the detent function to hold the shift lever 3 in the 1st speed position. Since the slider 42 of the switch box 4 is moved to the left-hand front by these two actions, the individual contacts are moved, as indicated at ① in FIG. 5, so that the contact 456 of the contact plate 45 comes into contact with the conductor 432 and the conductors 431 and 432 are connected through the contact 457, thus establishing a connection for outputting a 1st speed signal. Since, on the other hand, the manual valve connection member 23 shown in FIG. 3 is held immovable by the restriction of the rocking retainer 2 on the stationary member 1, there is no switching of the manual valve 86 through the control rod 81.

Figure 7C:
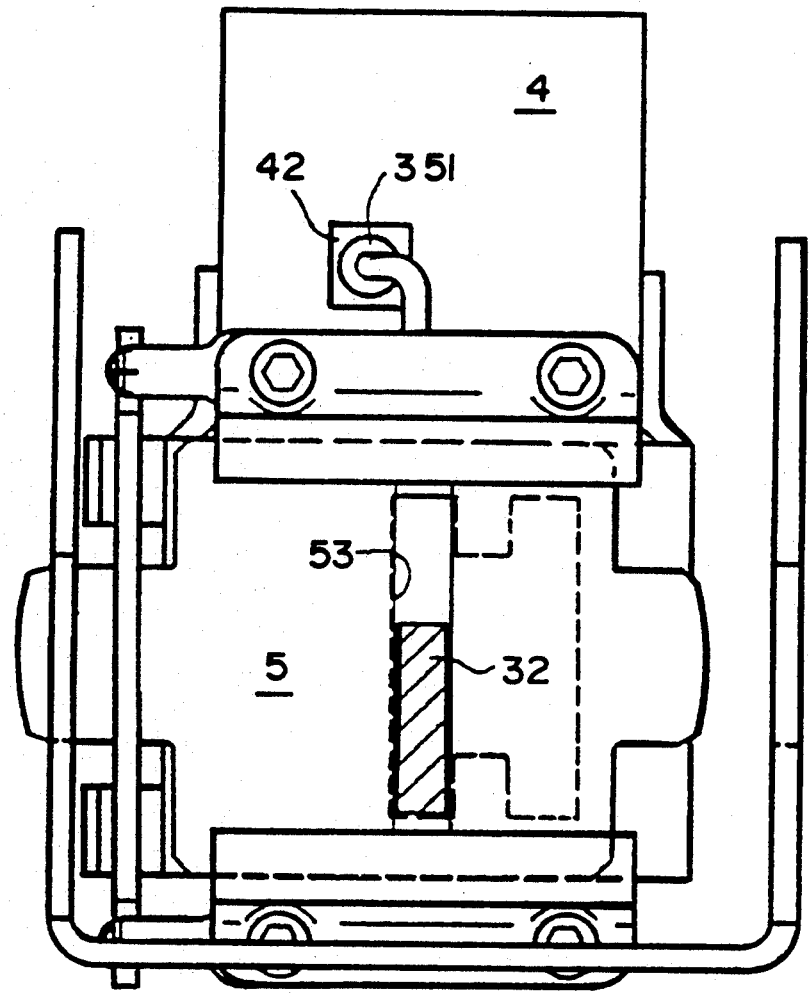

Reverting to Figs, 6 and 7, in order to select the 2nd speed, the shift lever 3 is moved leftward and then pulled backward. In this leftward motion, the rocking retainer 2 is restricted like before in its longitudinal pivoting motion, and only the shift lever 3 is left unrestricted. At the time of this action, the ball portion 351 slides the slider 24 of the switch box 4 to the left. In the subsequent backward pulling action, the connection portion 32 of the shift lever 3 slides backward along the slot 53 of the lock plate 5, as shown in FIG. 7(c), to move the slider 42 of the switch box 4 backward. As a result of these two actions, the individual contacts of the contact plate 45 shown in FIG. 5 move by way of passage ②. Since the contact 456 moves to the left rear, the conductors 431 and 434 are connected through the contacts 456 and 457 to establish a connection to output a 2nd speed signal. In this case, too, the manual valve connection member 23 is rendered immovable by the rocking retainer 2 abutting the stationary member 1 so that the manual valve 86 is not switched through the control rod 81.

Figure 6C:
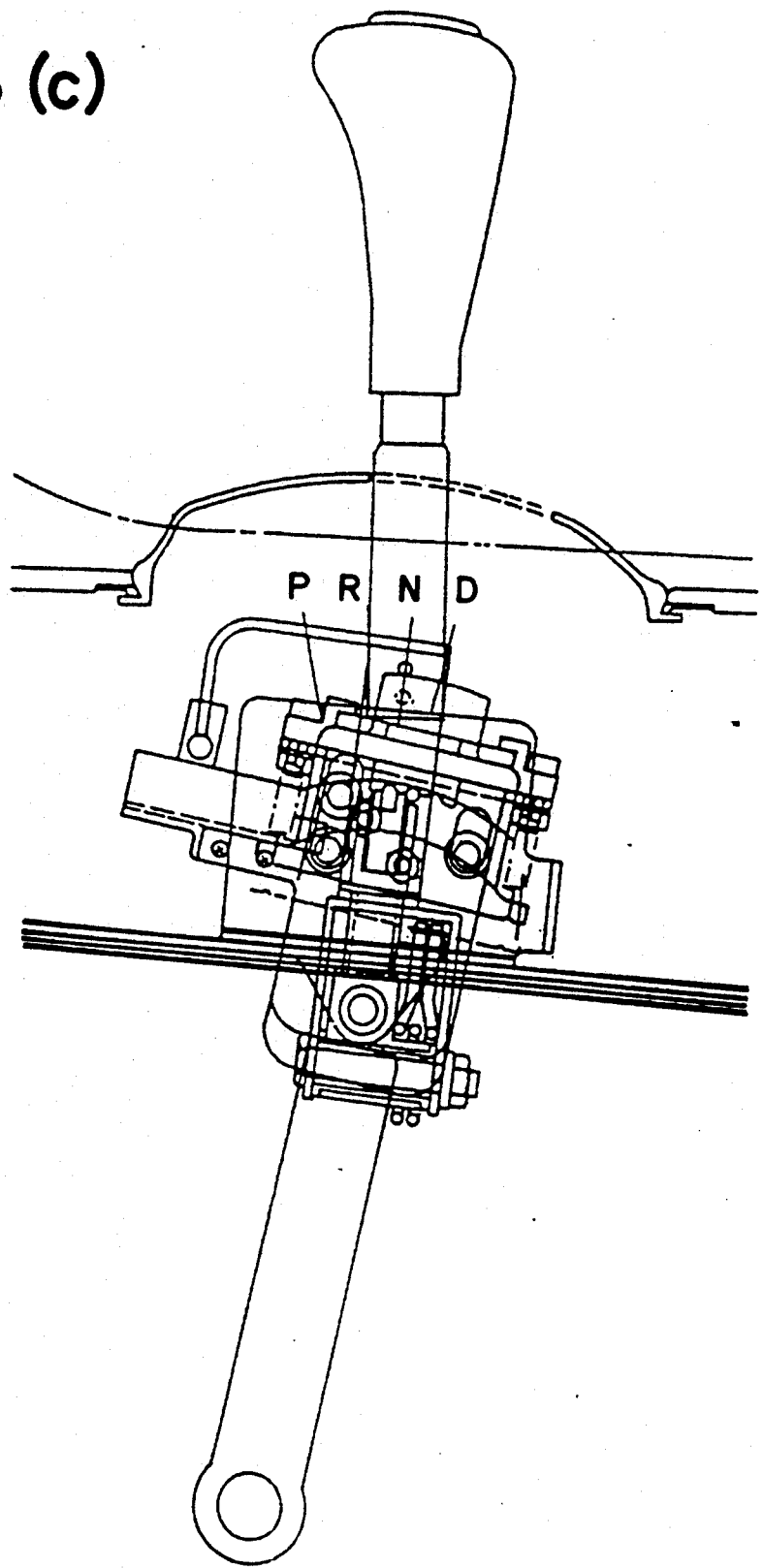
Figure 7D:
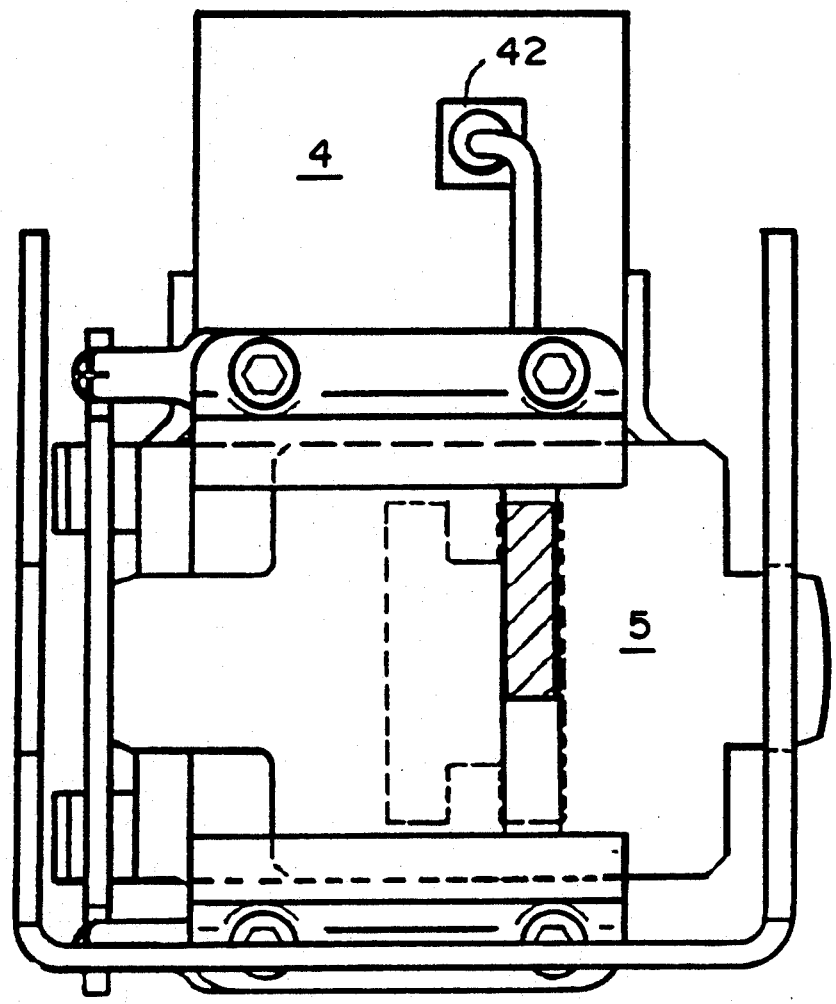
Figure 8A:
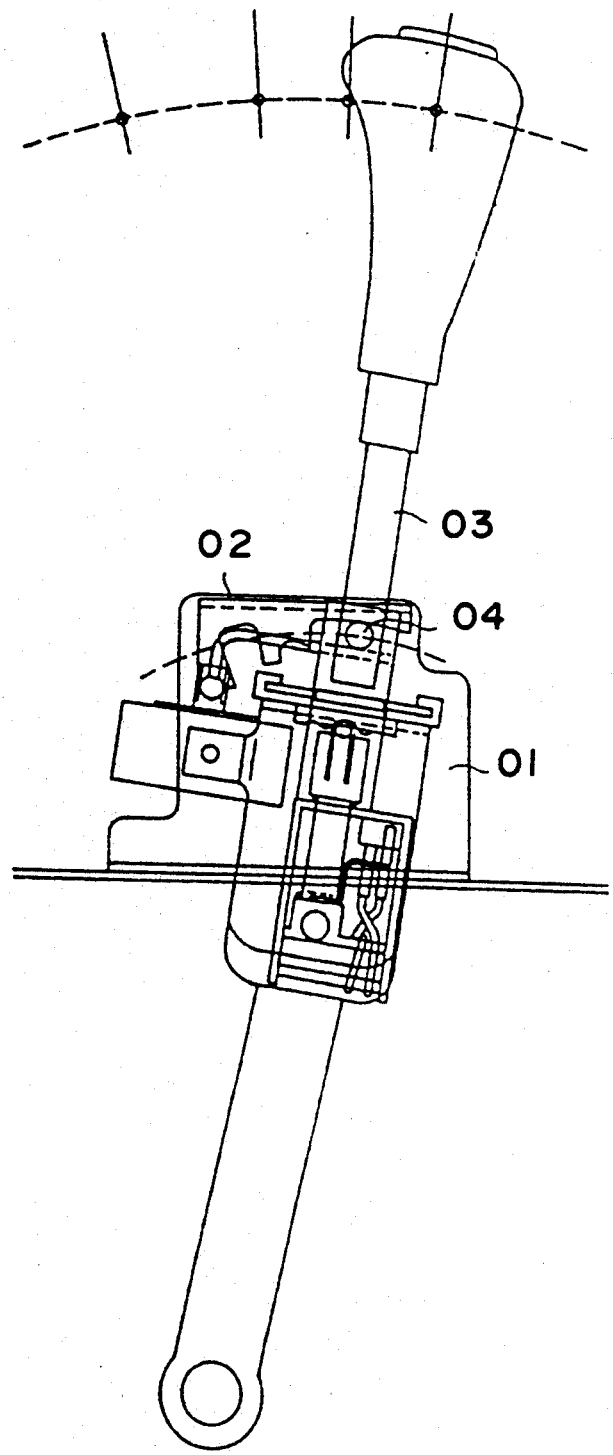
FIGS. 8(a) and 8(b) show the structure of an example of the prior art and present a side elevation at (a) and a back elevation at (b).
Figure 8B:
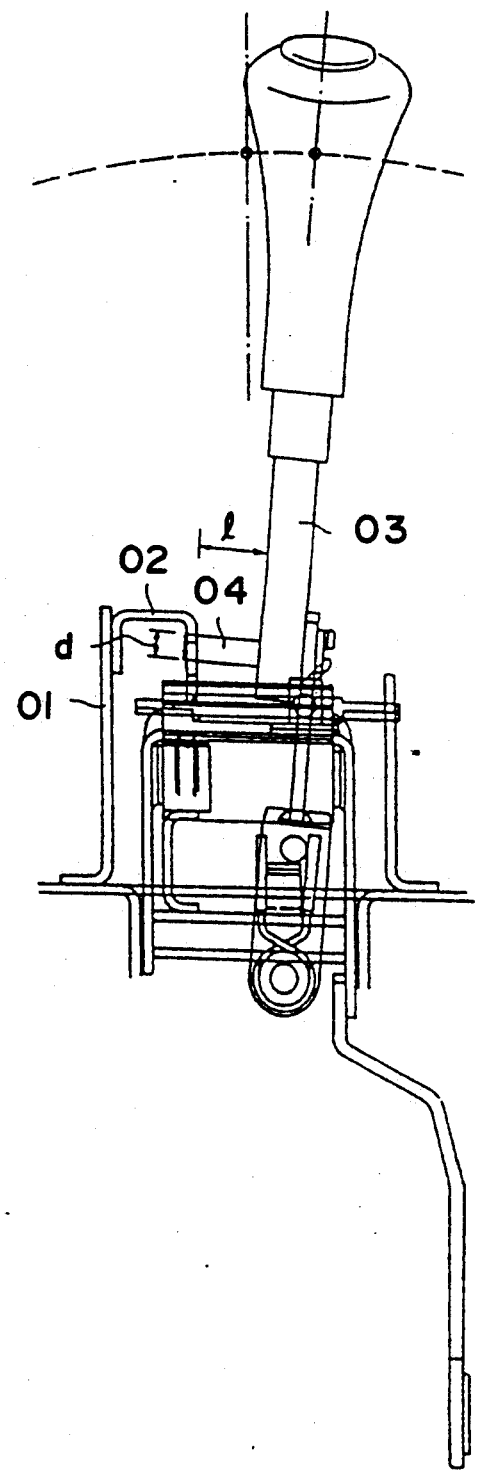

The selection of the 3rd speed is effected by a motion which is symmetric to that of the aforementioned case of the 2nd speed with respect to the point of the D position so that the lever moves rightward from the D position and is then pushed forward. Since the actions and functions of the individual members at this time are apparent from the foregoing description, further description will be omitted to avoid redundancy. The positions of the shift lever 3 and the lock plate 5 are as shown in FIG. 6(c) and FIG. 7(d). Thus, the slider 42 of the switch box 4 takes the right-hand front position so that the individual points of the contact plate 45 follow a passage ③ to establish a connection for output of a 3rd speed signal.

Figure 6D:
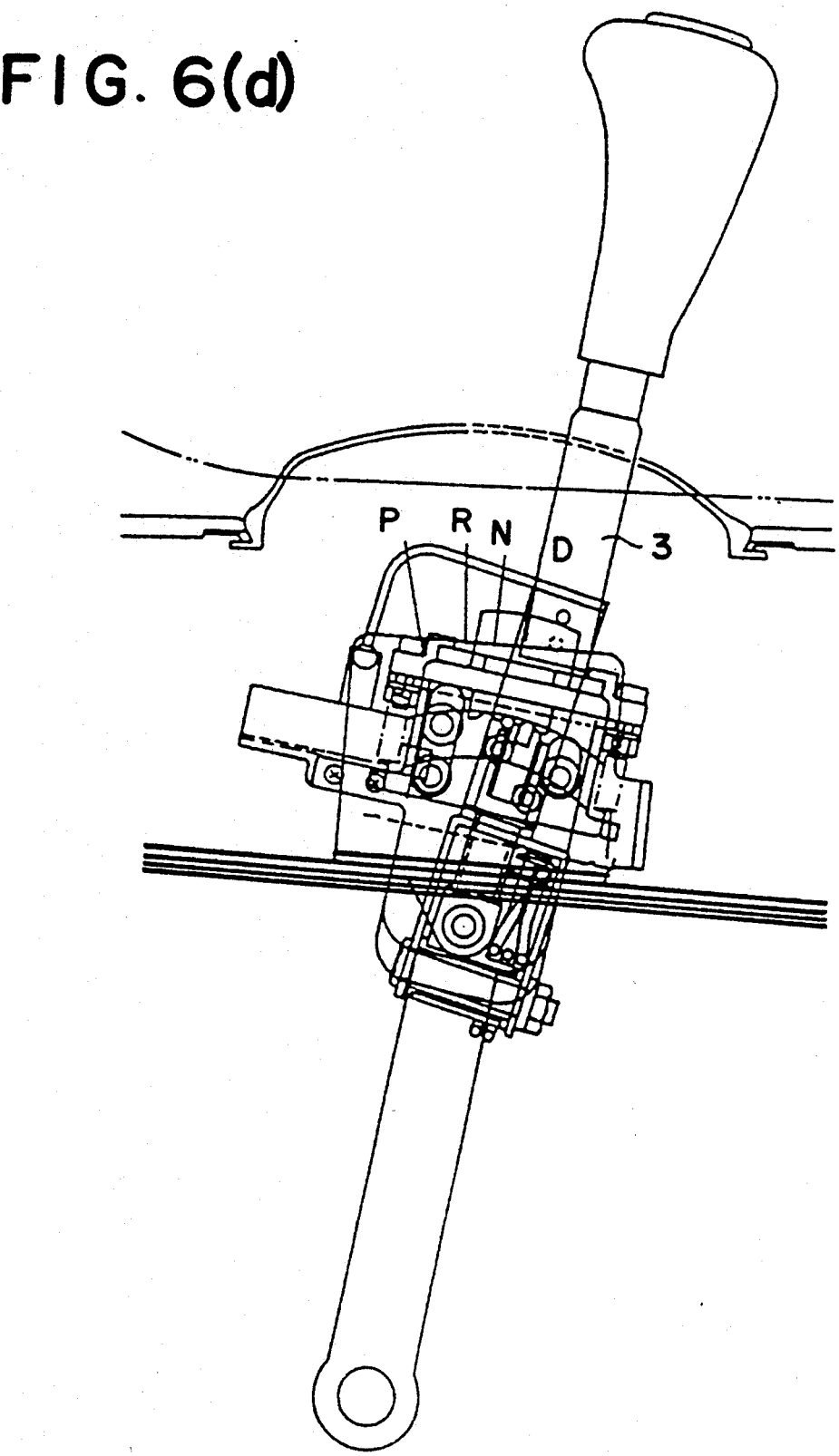

For selecting the 4th speed, moreover, the motion is symmetric with that of the aforementioned 1st speed selection relative to the point of the D position so that the shift lever 3 takes the position shown in FIG. 6(d). In this case, the slider 42 of the switch box 4 moves to the right rear position, and the individual contacts of the contact plate 45 move as indicated by arrow 4 to establish a connection for output of a 4th speed signal.

The speed selecting signals thus produced are processed like the shift signals, which are output in the ordinary operation of an automatic transmission, in accordance with the running speed and throttle opening of the vehicle, so that they may be used to control solenoid shift valves.

In this shift system, as has been described in detail above, the right-hand and left-hand ear portions of the cross-shaped lock plate 5 serve as guide means for the motion of the shift lever along the I slot in automatic shifting, and function as lock means for locking the rocking retainer 2 when in the manual shift mode. As a result, the system can be made compact by giving the two functions to the single member. Thanks to this relational arrangement of the lock plate 5 and the stationary member 1, the shift system can be housed in the center console (as shown in FIG. 6(a)) 100 of the vehicle. As a result, the lock mechanism has sufficient strength without detracting from its external appearance. An additional effect of eliminating the restriction on the design of an upper plate 101 an be achieved, which is different from the prior art wherein the upper plate of the center console must be strengthened sufficiently to serve as guide means. Moreover, in the above-described embodiment, the switch box 4 is attached to the rocking retainer 2 to eliminate the relative motions between the switch box 4 and the shift lever 3 moving between the P, R, N and D positions to thereby minimize the stroke distance required for switching contacts. Thus the switch box 4 itself can be miniaturized.

Moreover, even if the shift lever 3 associated with the gate plate 22 of the rocking retainer 2 is inclined by the manual shift, it is prevented from interfering with the inhibit pin 34 of the inhibit mechanism of the present embodiment, merely by pushing up the upper edge forming the associated face of the inhibit plate 7 or by separating the inhibit pin 34 from the upper edge 75. The inhibit pin 34 of the inhibit mechanism functions to displace to the inhibit plate 7 through contact with the upper edge 75. Then, the load accompanying the inhibiting action is applied to both the plate pin 71 on the inhibit plate 7 and the hole 123 formed in the body 12 of the stationary member 2 and providing the inhibit cam. As a result, strength similar to that of the prior art mechanism is retained by their close arrangement without increasing the strength of any one component. Furthermore, the inhibit hole 123 which is forced in the body 12 of the stationary member 2 offsets the loss of space and the weight increase due to addition of inhibit plate 7.

According to the present invention, therefore, a shift system with a manual speed selecting mechanism combined with the inhibit mechanism can be provided by making use of a portion of the manual transmission mechanism, without any increase in the size and weight of the mechanism.

Although the present invention has been described in detail above in connection with one embodiment, it is not limited to the foregoing embodiment but, rather, can vary with changes in specific details within the scope of the appended claims.

What is claimed is:

1. A shifter with a manual speed selecting mechanism for an automatic transmission mounted in a vehicle body, comprising:
   a stationary member mounted on the vehicle body;
   a rocking retainer pivotally supported by said stationary member for pivoting motion about a first axis;
   a shift lever for rotation about said first axis and about a second axis, said second axis being perpendicular to said first axis, with rotation about said second axis bringing said shift lever into and out of engagement with said rocking retainer;
   switch means for detecting the angular position of said shift lever relative to said stationary member;
   a lock plate supported on said rocking retainer for bringing said rocking retainer into and out of engagement with said stationary member responsive to the rotation of said shift lever about said second axis.

2. A shifter according to claim 1, further comprising:
   a first sleeve defining said first axis and rotatably mounted on said stationary member; and a second sleeve intersecting said first sleeve at a right angle and defining said second axis, wherein said shift lever is rotatably supported by said second sleeve for rotation together with said first sleeve about said second axis.

3. A shifter according to claim 2, further comprising:
   a torsion spring rotatably mounted on the exterior of said second sleeve;
   a torsion spring abutment member having two ends and fixed to the exterior of said first sleeve; and
   an abutment member mounted on said shift lever for engagement with said torsion spring abutment member,
   wherein said torsion spring has two ends retained individually by the two ends of said torsion spring abutment member and said abutment member, as the shift lever rotates about said second axis, so that said torsion spring exerts an elastic bias against the rotation of said shift lever.

4. A shifter according to claim 2, further comprising:
   a detent block mounted in said rocking retainer and engageable by said shift lever in rotation about said first axis; and
   a plunger in said first sleeve and urged in a direction perpendicular to said first axis for positioning said detent block.

5. A shifter according to claim 3, further comprising:
   an inhibit pin mounted in said shift lever;
   an inhibit cam on said stationary member; and
   an inhibit plate mounted on said rocking retainer for movement by engagement with said inhibit pin and having a protrusion engaging said inhibit cam.

6. A shifter according to claim 5, further comprising:
   an inhibit spring mounted between said inhibit plate and said rocking retainer for urging said inhibit plate against the force of said torsion spring to engage said inhibit plate with said inhibit cam.

7. A shifter according to claim 5, wherein said inhibit plate has slots for receiving guide posts formed on said rocking retainer, for movement in association with the action of said inhibit pin.

8. A shifter according to claim 1, further comprising:
   an inhibit pin mounted in said shift lever;
   an inhibit cam on said stationary member; and
   an inhibit plate mounted on said rocking retainer for movement by engagement with said inhibit pin and having a protrusion engaging said inhibit cam.

* * * * *

UNITED STATES PATENT AND TRADEMARK OFFICE
CERTIFICATE OF CORRECTION

PATENT NO. : 5,249,478

DATED : October 5, 1993

INVENTOR(S) : MOROTO et al

It is certified that error appears in the above-indentified patent and that said Letters Patent is hereby corrected as shown below:

On the face of the patent, "[73] Assignee: Aisin Aw Co., Ltd." should read --[73] Assignee: Aisin AW Co., Ltd.--.

In the Abstract, line 3, before "a", third instance, insert --and--.

Col. 1, line 35, after "shifting" insert a comma --,--.

Col. 2, line 63, "plane" should read --plan--.

Col. 3, line 12, after "are" insert --not--;

line 23, delete "longitudinal" insert --transverse--; and line 38, delete "a", second instance.

UNITED STATES PATENT AND TRADEMARK OFFICE
CERTIFICATE OF CORRECTION

PATENT NO. : 5,249,478
DATED : October 5, 1993
INVENTOR(S) : MOROTO et al

It is certified that error appears in the above-indentified patent and that said Letters Patent is hereby corrected as shown below:

Col. 4, line 42, "ar" should read --arem--; and
      line 67, delete "10".

Signed and Sealed this

Nineteenth Day of July, 1994

Attest:

*Attesting Officer*

BRUCE LEHMAN

*Commissioner of Patents and Trademarks*